(12) United States Patent
Dreischarf et al.

(10) Patent No.: US 6,758,129 B2
(45) Date of Patent: Jul. 6, 2004

(54) COLLAPSIBLE PUSHROD FOR A POWER BRAKE OF A VEHICLE

(75) Inventors: Derek T. Dreischarf, Kettering, OH (US); Michel J. Vermoesen, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 131 days.

(21) Appl. No.: 10/133,801

(22) Filed: Apr. 26, 2002

(65) Prior Publication Data

US 2003/0200863 A1 Oct. 30, 2003

(51) Int. Cl.[7] .................................................. F16J 1/10
(52) U.S. Cl. ......................... 92/84; 91/376 K; 60/403; 180/271
(58) Field of Search .................... 60/403; 91/376 R; 92/84; 180/232, 271, 282; 280/748

(56) References Cited

U.S. PATENT DOCUMENTS

| | | | |
|---|---|---|---|
| 3,719,123 A | * | 3/1973 | Cripe ..................... 91/391 R |
| 4,987,968 A | * | 1/1991 | Martus et al. ............. 180/271 |
| 5,848,662 A | | 12/1998 | Sakaue |
| 5,896,781 A | | 4/1999 | Müller |
| 5,916,330 A | | 6/1999 | Jacobson |
| 6,286,388 B1 | | 9/2001 | Brewer |
| 6,547,048 B2 | | 4/2003 | Haerr et al. |
| 6,637,837 B2 | | 10/2003 | Petin et al. |

FOREIGN PATENT DOCUMENTS

DE             196 17 372 C1        1/1998

* cited by examiner

Primary Examiner—F. Daniel Lopez
(74) Attorney, Agent, or Firm—Michael D. Smith

(57) ABSTRACT

A collapsible push rod for a brake booster in a vehicle is provided, having first and second telescoping members, and retractable locking means for selectively locking the first and second members together against telescoping. During a frontal impact collision, the members telescope into one another to shorten the length of the push rod and compensate for rearward movement of the brake booster and forward movement of the driver. The push rod is operable in the collapsed state. The push rod is also re-settable after the collision, and includes features for returning the push rod to its normal un-telescoped length following the collision, if the push rod is not damaged in the collision. The retractable locking means includes an electrically actuated solenoid for selectively locking and unlocking the first and second members against telescoping, in response to an electrical signal applied to the solenoid.

18 Claims, 2 Drawing Sheets

COLLAPSIBLE PUSHROD FOR A POWER BRAKE OF A VEHICLE

TECHNICAL FIELD OF THE INVENTION

This invention relates to vehicle brake systems, and more particularly to provisions of brake systems for reducing the risk of injury to vehicle operators from shock transmitted through a brake pedal when the vehicle is involved in a collision.

BACKGROUND OF THE INVENTION

Vehicles such as automobiles, trucks, buses, and motor homes typically include a dashboard at the front of the passenger compartment, having a pneumatic or hydraulic brake booster mounted on the front of the dashboard connected by a push rod to a brake pedal mounted on a pedal bracket assembly located within the passenger compartment.

In a collision involving major frontal impact damage to a vehicle, components on the front side of the dashboard, including the power brake, are sometimes driven back toward the passenger compartment. The driver is also thrown forward for a short distance with considerable force, despite the proper use of a driver restraint system.

The combination of rearward movement of the brake booster, and forward movement of the driver can result in injury to the driver from contact with the brake pedal, or from force transmitted through the push rod to the brake pedal.

What is needed, therefore, is an improved push rod that reduces the risk of injury to the driver in a frontal collision. It is also desirable that following such a collision the push rod be configured to remain operative after the collision, and to return fully to normal operation after the collision.

SUMMARY OF THE INVENTION

Our invention provides such an improved push rod in the form of a collapsible push rod having first and second telescoping members, and retractable locking means for selectively locking the first and second members together against telescoping. During a frontal impact collision, the members telescope into one another to shorten the length of the push rod and compensate for rearward movement of the brake booster and forward movement of the driver.

The push rod may include features that allow the push rod to continue functioning while in the collapsed state.

The push rod may also include features for re-setting the retractable locking means after the collision. The push rod may also include features for returning the push rod to its normal un-telescoped length following the collision, if the push rod is not damaged in the collision.

The retractable locking means may include an electrically actuated solenoid for selectively locking and unlocking the first and second members against telescoping, in response to an electrical signal applied to the solenoid.

Our invention may also take the form of a brake apparatus or a vehicle including a push rod as disclosed herein.

The foregoing and other features and advantages of our invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
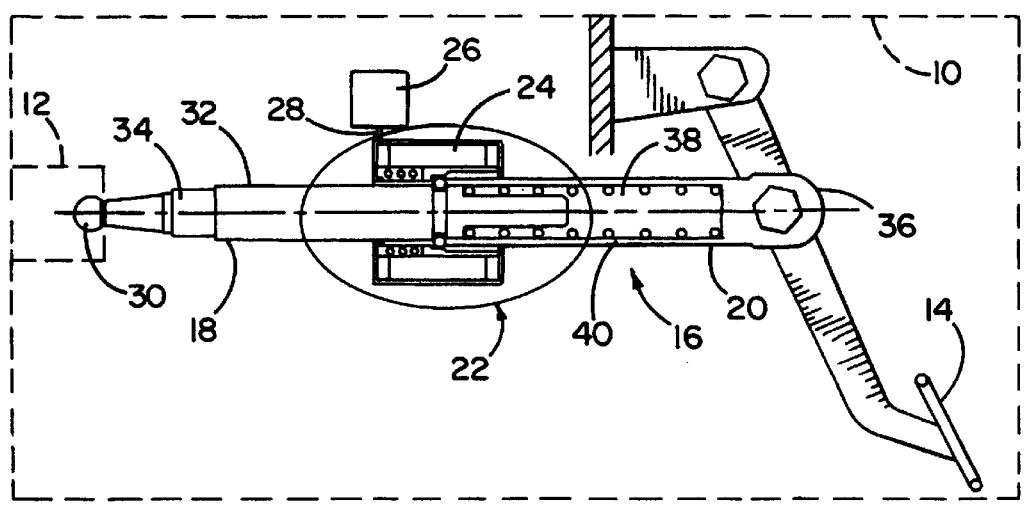
FIG. 1 is a schematic depiction of a vehicle including a collapsible push rod for a vacuum booster, according to our invention.

FIG. 1 shows an exemplary embodiment of a vehicle 10 having a brake apparatus including a vacuum booster 12 and brake pedal 14 mounted to the vehicle 10, operatively connected by a collapsible push rod 16. The push rod includes first and second telescoping members 18 and 20, and retractable locking means 22 for selectively locking the first and second members 18, 20 together against telescoping. The retractable locking means 22 of the push rod 16 includes an electrically actuated solenoid 24 for selectively locking and unlocking the first and second members 18, 20 against telescoping, in response to an electrical signal applied to the solenoid 24. The vehicle 10 further includes an electrical circuit 26 for sensing an impact and applying an electrical signal via line 28 to the solenoid 22 for unlocking the first and second members 18, 20, thereby allowing them to telescope.

The first member 18 is adapted at one end 30 thereof for attachment to a first element, in the form of the booster 12, of the brake apparatus, and has an elongated generally cylindrical shaft portion 32 thereof defining and extending from the one end 30 along an axis 34 of the push rod 16. The second member 20 is adapted at one end 36 thereof for attachment to a second element of the brake apparatus, in the form of the brake pedal 14. The second member 20 defines a generally cylindrical elongated bore 38 therein, for receipt of the shaft portion 32 of the first member 18 of the push rod 16, and an annular wall 40 surrounding the bore 38.

Figure 2:
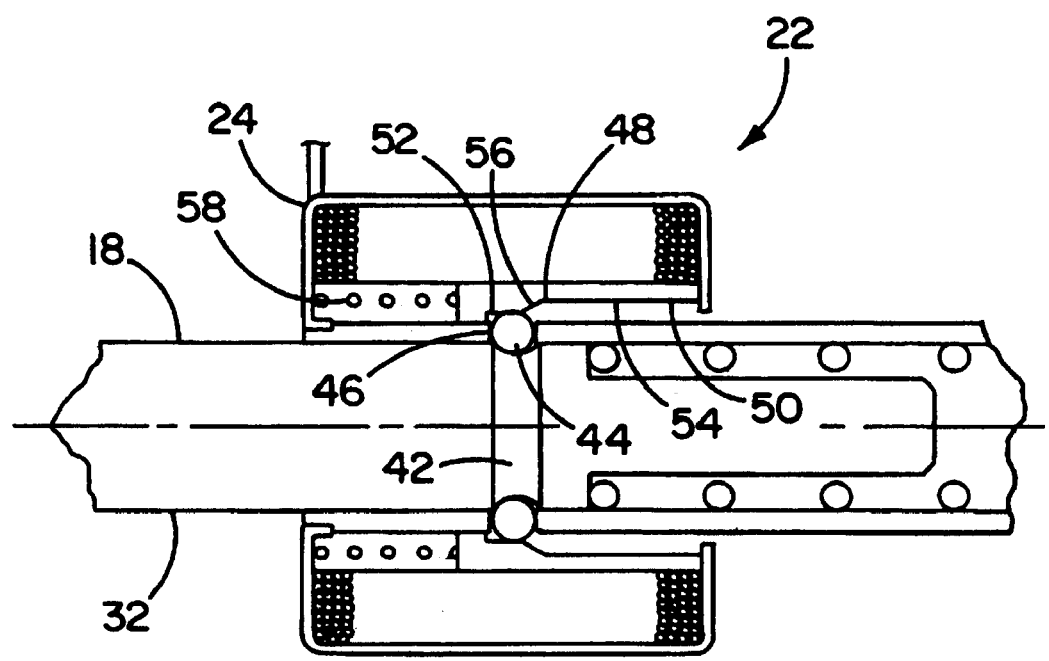
FIG. 2 is an enlarged view of a locking means of the push rod of FIG. 1.

As shown in FIG. 2, the shaft portion 32 of the first member 18 includes an annular groove 42 for partial receipt therein of one or more locking balls 44. The second member 20 includes a hole 46 for each ball 44 extending through the annular wall 40 for passage there through of the locking ball 44. The push rod 16 includes a locking ball 44 disposed in each hole 46. The locking means 22 is configured for maintaining the balls 44 in the holes 46 in partial engagement with the annular groove 42, for locking the first and second members 18, 20 together to resist telescoping of the push rod 16. The locking means 22 are further configured for selectively allowing the balls 44 to disengage from the annular groove 42 to allow the push rod 16 to telescope.

The locking means 22 includes a locking ring 48 slidably disposed about and adapted for axial movement along the annular wall 40 over the holes 46 in the annular wall 40. The locking ring 48 has an inner surface 50 thereof defining axially spaced radially inner and outer sections 52, 54 thereof. The radially inner section 52 of the inner surface 50 of the locking ring 48 holds the balls 44 in partial engagement with the annular groove 42. The radially outer section 54 holds the balls 44 when the balls 44 are disengaged from the annular groove 42.

The solenoid 24 provides a means for moving the locking ring 48 axially to selectively bring the radially inner and outer sections 52, 54 of the locking ring 48 to bear against the balls 44. The inner surface 50 of the locking ring 48 further defines a ramp 56 between the radially inner and outer sections 52, 54 of the inner surface 50 for facilitating movement of the locking ring 48 over the balls 44. The locking means 22 further includes a spring 58 for urging the locking ring 48 to move axially such that the radially inner section 52 of the inner surface 50 of the locking ring 48 is disposed over the balls 44.

Figure 3:
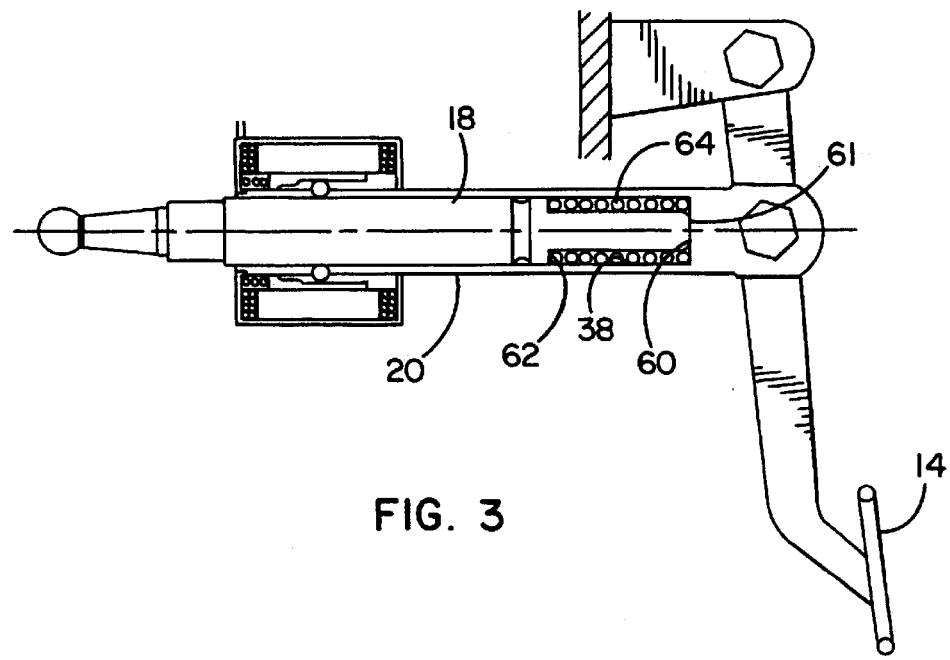
FIG. 3 is a schematic representation of a portion of the collapsible push rod of FIG. 1, showing the collapsible push rod in a fully telescoped state.

As shown in FIG. 3, the push rod 16 further includes means for limiting the distance that the first and second members 18, 20 can telescope into one another. The second end of the shaft portion 32 defines an axially facing surface 61 and an axially facing shoulder 62. The second member 20 includes an axially facing surface 60 of the bore 38. The shaft portion 32 and bore 38 are configured such that the axially facing surface 61 of the shaft portion 32 will come to bear against the axially facing surface 38 of the bore 32 when the push rod 16 has telescoped inward to a predetermined minimum length. The push rod 16 includes means, in the form of a spring 64 disposed in the bore between the axially facing surface 62 of the second end of the shaft portion 32 of the first member 18 and the axially facing surface 60 of the bore 38 for urging the first and second elements 18, 20 to move axially outward from a telescoped position.

Prior to a frontal impact collision of the vehicle 10, the collapsible push rod 16 is in its fully extended state, with the balls 44 being held by the radially inner section 52 of the locking ring 48 in engagement with the annular groove 42, thereby locking the first and second members 18, 20 against telescoping, as shown in FIGS. 1 and 3.

Upon sensing a frontal impact of sufficient magnitude, the electrical circuit 26 applies an electrical signal to the solenoid 24. The solenoid 24 generates an electromagnetic field that moves the locking ring 48 axially, allowing the balls 44 to move outward through the holes 46 along the ramp 56 to the radially outer section 54 of the inner surface 50 of the locking ring 48. Once the balls 44 disengage from the annular groove, 42, the first and second members 18, 20 of the collapsible push rod 16 can telescope into one another to absorb rearward movement of the booster 12, or forward movement of the brake pedal 14 due to pressure exerted on the pedal 14 by the driver.

In the telescoped state, the push rod 16 can still transmit pedal pressure to the booster 12, by virtue of the axially facing surface 61 of second end of the first member 18 bearing against the axially facing surface 60 of the bore 38 in the second member 20.

After the collision, the spring 64 will return the push rod 16 to its fully extended state, and the spring 58 and ramp 56 of the locking means 22 will push the balls 44 back into engagement with the annular groove 42 in the first member 18 when the annular groove 42 passes under the holes 46, thereby resetting the locking means 22 and locking the first and second members 18, 20 together in the fully extended state.

While the embodiments of our invention disclosed herein are presently considered to be preferred, various changes and modifications can be made without departing from the spirit and scope of the invention. For example, the position of the first and second members 18, 20 may be reversed, such that the second member connects to the booster 12 and the first member connects to the brake pedal 14. Other types of re-settable locking means may be used. In some vehicles, the brake pedal has a return spring that can be used for returning the push rod 16 to its fully extended state and resetting the locking means. Locking mechanisms other than the balls 44 and annular groove 42 may be used for locking the first and second members 18, 20 in the fully extended state.

The scope of the invention is indicated in the appended claims. We intend that all changes or modifications within the meaning and range of equivalents are embraced by the claims.

We claim:

1. A collapsible push rod for operatively connecting a brake pedal of a vehicle to a brake booster of the vehicle, for transmitting a braking force applied to the brake pedal by a driver of the vehicle to the brake booster, the collapsible push rod comprising:

first and second telescoping members operatively connected to one another, and adapted for connection to the brake booster and the brake pedal;

the first and second members being temporarily collapsible into one another during a frontal impact collision of the vehicle for shortening the push rod from a fully extended state to a collapsed state, to thereby compensate for potential rearward movement of the brake booster and forward movement of the driver during the collision;

the push rod remaining operable for transmitting the braking force from the first member to the second member in the collapsed state;

the push rod automatically returning to the fully extended state, following the collision, when the driver releases the braking force front the brake pedal; and the push rod automatically re-setting to a fully operative condition in the fully extended state, following the collision, when the driver releases the braking force from the brake pedal, without repair or maintenance of the push rod.

2. The push rod of claim 1, further comprising, retractable locking means for selectively locking be first and second members together against telescoping.

3. The push rod of claim 2 wherein the retractable locking means includes an electrically actuated solenoid for selectively locking and unlocking the first and second members against telescoping, in response to an electrical signal applied to the solenoid.

4. The push rod of claim 3 wherein:

the first member is adapted at one end thereof for attachment to a first element of a brake apparatus including the brake booster and brake pedal, and has an elongated generally cylindrical shaft portion thereof defining and extending from the one end along an axis of the push rod; and the second member is adapted at one end thereof for attachment to a second element of the brake apparatus, the second member defining a generally cylindrical elongated bore therein for receipt of the shaft portion of the first member of the push rod, and also defining an annular wall surrounding the bore.

5. The push rod of claim 4 wherein:

the shaft portion of the first member includes an annular groove for partial receipt therein of a locking ball;

the second member includes a bole extending through the annular wall for passage therethrough of the locking ball;

the push rod includes the locking ball disposed in the hole; and the locking means is configured for maintaining the ball in the hole in partial engagement with the annular groove for locking the first and second members together to resist telescoping of the push rod, the locking means being further configured for selectively allowing the ball to disengage from the annular groove to allow the push rod to telescope.

6. The push rod of claim 5 wherein:

the locking means includes a locking ring slidably disposed about and adapted for axial movement along the annular wall over the hole in the annular wall;

the locking ring having an inner surface thereof defining axially spaced radially inner and outer sections thereof, the radially inner section thereof for holding the ball in partial engagement with the annular groove, and the radially outer section thereof for holding the ball when the ball is disengaged from the annular groove.

7. The push rod of claim 2 wherein the locking means includes means for moving the locking ring axially to selectively bring the radially inner and outer sections of the locking ring to bear against the ball.

8. The push rod of claim 7 wherein said means for moving the locking ring axially includes an electrical solenoid.

9. The push rod of claim 7 wherein the inner surface of the locking ring further defines a ramp between the radially inner and outer sections of the inner surface for facilitating movement of the locking ring over the ball.

10. The push rod of claim 7 wherein the locking means further includes a spring for urging the locking ring to move axially such that the radially inner section of the inner wall of the locking ring is disposed over the ball.

11. The push rod of claim 1 further including means for limiting the distance that the first and second members can telescope into one another.

12. The push rod of claim 11 wherein:

the first member is adapted at one end thereof for attachment to a first element of a brake apparatus and has an elongated generally cylindrical shaft portion thereof defining and extending from the one end along an axis of the push rod;

the second member is adapted at one end thereof for attachment to a second element of the brake apparatus, the second member defining a generally cylindrical elongated bore therein for receipt of the shaft portion of the first member of the push rod, an annular wall surrounding the bore, and an axially facing surface of the bore; and the shaft portion and bore are configured such that the shaft portion will come to bear against the axially facing surface of the bore when the push rod has telescoped inward to a predetermined minimum length.

13. The push rod of claim 1 further including means for urging the first and second elements members to move axially outward from a telescoped position.

14. The push rod of claim 13 further including a spring for urging the first and second elements members to move axially outward from a telescoped position.

15. The push rod of claim 14 wherein:

the first member is adapted at one end thereof for attachment to a first element of a brake apparatus and has an elongated generally cylindrical shaft portion thereof defining and extending from the one end along an axis of the push rod to a second end of the shaft portion defining an axially facing surface thereof;

the second member is adapted at one end thereof for attachment to a second element of the brake apparatus, the second member defining a generally cylindrical elongated bore therein for receipt of the shaft portion of the first member of the push rod, an annular wall surrounding the bore, and an axially facing surface of the bore; and the spring is disposed in the bore between the axially facing surface of the second end of the shaft portion of the first member and the axially facing surface of the bore.

16. A brake apparatus comprising:

a brake booster; and a collapsible push rod adapted for operatively connecting a brake pedal of a vehicle to the brake booster for transmitting a braking force applied to the brake pedal by a driver of the vehicle to the brake booster, the collapsible push rod comprising:

first and second telescoping members operatively connected to one another and the brake booster, and adapted for operative connection to the brake pedal;

the first and second members being temporarily collapsible into one another during a frontal impact collision of the vehicle for shortening the push rod from a fully extended state to a collapsed state, to thereby compensate for potential rearward movement of the brake booster and forward movement of the driver during the collision, the push rod remaining operable for transmitting the braking force from the first member to the second member in the collapsed state;

the push rod automatically returning to the fully extended state, following the collision, when the driver releases the braking force from the brake pedal; and the push rod automatically re-setting to a fully operative condition in the fully extended state, following the collision, when the driver releases the braking force from the brake pedal, without repair or maintenance of the push rod.

17. The brake apparatus of claim 16, wherein the push rod further comprises:

retractable locking means for selectively locking the first and second members together against telescoping;

the retractable locking means of the push rod including an electrically actuated solenoid for selectively locking and unlocking the first and second members against telescoping, in response to an electrical signal applied to the solenoid.

18. The vehicle of claim 17 further comprising an electrical circuit in the vehicle for sensing an impact and applying an electrical signal to the solenoid for unlocking the first and second members, thereby allowing them to telescope.

* * * * *